(12) United States Patent
Seo et al.

(10) Patent No.: US 10,682,613 B2
(45) Date of Patent: Jun. 16, 2020

(54) ADSORPTIVE LIQUID FILTER

(71) Applicant: AMOGREENTECH CO., LTD., Gimpo-si (KR)

(72) Inventors: In Yong Seo, Seoul (KR); Ui Young Jeong, Incheon (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 336 days.

(21) Appl. No.: 15/570,853

(22) PCT Filed: May 18, 2016

(86) PCT No.: PCT/KR2016/005233
§ 371 (c)(1),
(2) Date: Oct. 31, 2017

(87) PCT Pub. No.: WO2016/195284
PCT Pub. Date: Dec. 8, 2016

(65) Prior Publication Data
US 2018/0147533 A1    May 31, 2018

(30) Foreign Application Priority Data

Jun. 1, 2015   (KR) ........................ 10-2015-0077318

(51) Int. Cl.
*B01D 63/06*    (2006.01)
*B01D 35/02*    (2006.01)
*B01D 39/08*    (2006.01)
*B01D 39/16*    (2006.01)
(Continued)

(52) U.S. Cl.
CPC ........... *B01D 63/065* (2013.01); *B01D 35/02* (2013.01); *B01D 39/08* (2013.01); *B01D 39/16* (2013.01);
(Continued)

(58) Field of Classification Search
CPC .... B01D 63/063; B01D 71/06; B01D 71/022; B01D 39/2027; B01D 39/1692;
(Continued)

(56) References Cited

U.S. PATENT DOCUMENTS

2016/0136584 A1*  5/2016  Hwang ................. B29C 70/504
                                                            210/483
2016/0136586 A1*  5/2016  So .......................... B01D 71/60
                                                            210/500.37

FOREIGN PATENT DOCUMENTS

KR    20080104911    12/2008
KR    20100036691    4/2010
(Continued)

OTHER PUBLICATIONS

English translation of Korean Patent Application No. 10-2014-0023012 A (2014).*

(Continued)

*Primary Examiner* — John Kim
(74) *Attorney, Agent, or Firm* — Cantor Colburn LLP (57) ABSTRACT

Provided is an adsorptive liquid filter including: a support tube having a hollow portion formed in a tubular shape and having a plurality of throughholes penetrating the hollow portion from an outer circumferential surface thereof; and an adsorptive membrane which is enclosed by the outer circumferential surface of the support tube and adsorbs foreign substances contained in contaminated liquid, the adsorption membrane including: a support member having a plurality of first pores; and a first adsorptive member which is stacked on the support member and has a plurality of second pores formed therein and is made by accumulating ion exchange nanofibers for adsorbing foreign substances.

13 Claims, 6 Drawing Sheets

(51) Int. Cl.
  *B01D 39/20* (2006.01)
  *B01D 71/02* (2006.01)
  *B01D 71/06* (2006.01)
  *B01J 47/12* (2017.01)

(52) U.S. Cl.
  CPC ..... *B01D 39/1692* (2013.01); *B01D 39/2027* (2013.01); *B01D 63/063* (2013.01); *B01D 63/067* (2013.01); *B01D 71/022* (2013.01); *B01D 71/06* (2013.01); *B01J 47/12* (2013.01); *B01D 2239/025* (2013.01); *B01D 2239/0613* (2013.01); *B01D 2239/0618* (2013.01); *B01D 2239/0631* (2013.01); *B01D 2239/1216* (2013.01)

(58) Field of Classification Search
  CPC ........ B01D 39/16; B01D 39/08; B01D 35/02; B01D 2239/025; B01D 2239/1216; B01D 2239/0631; B01D 2239/0618; B01D 2239/0613; B01D 63/065; B01D 63/067; B01J 47/12
  See application file for complete search history.

(56) References Cited

FOREIGN PATENT DOCUMENTS

| | | |
|---|---|---|
| KR | 20100052555 | 5/2010 |
| KR | 20100053989 | 5/2010 |
| KR | 20120005479 | 1/2012 |
| KR | 20120077266 | 7/2012 |
| KR | 20140023012 | 2/2014 |
| KR | 20140047997 | 4/2014 |
| KR | 20150017298 | 2/2015 |

OTHER PUBLICATIONS

English translation of Korean Patent Application No. 102015-0017298 A (2015).*
English translation of Korean Patent Application No. 10-2014-0047997 A (2014).*
International Search Report—PCT/KR2016/005233 dated Oct. 18, 2016.

* cited by examiner

ADSORPTIVE LIQUID FILTER

TECHNICAL FIELD

The present disclosure relates to a liquid filter, and more particularly, to an adsorptive liquid filter capable of maximizing the flow rate of liquid and improving the purifying performance of contaminated liquid.

BACKGROUND ART

In recent years, environmental problems such as leachate leaking from various kinds of garbage generated along with the development of industry and penetrating into the underground, polluted air falling along with rainwater and penetrating into the underground, and pollution of water, are damaging to human healthy life.

In order to solve the environmental problems caused by water pollution, various solutions such as recycling of wastewater, purification of drinking water for household use, treatment of chemical substances and so on have been searched, and a multifaceted research on a liquid treatment filter for substantially purifying contaminated water has been conducted.

The liquid treatment filter is divided into a simple filtration treatment and an adsorptive filtration treatment. Depending on the direction of the liquid flowing into the filter, the filter may be divided into a downflow system that flows from the upper portion of the filter to the lower portion thereof and an upflow system that flows from the lower portion of the filter to the upper portion thereof, and depending on the pressure, the filter may be classified into a gravity type and a pressure type.

Cartridge-type liquid filters, which are kinds of the liquid treatment filters, have been increasingly used because of their high utility in domestic and industrial applications, but excellent performance capable of removing various microorganisms, various heavy metals and chemicals contained in liquids with high efficiency is desperately required.

Meanwhile, a membrane is used as a separation membrane of a liquid treatment filter, and serves to filter other impurities in the water through a membrane film.

Polymer membranes, which are a kind of such membranes, are prepared by forming a polymer solution by selecting a suitable polymer and a solvent, casting the polymer solution into a thin sheet, and depositing the same in solid-phase and used as a liquid filtration use.

Korean Patent Application Publication No. 10-2011-0005479 discloses a cylindrical cartridge filter comprising: a deep layer portion which is an inner core without a support while applying heat by using a polypropylene melt-blown nonwoven web and a polypropylene/polyethylene sheeting nonwoven web of medium density having a porosity of 20% to 40%; an intermediate layer portion having excellent particle removal performance while applying heat by using a nonwoven nano-web and a polypropylene/polyethylene sheeting nonwoven web of high density having a porosity of 10% to 30%; and an outer layer portion while applying heat by using a polypropylene melt-blown nonwoven web and a polypropylene/polyethylene sheeting nonwoven web of low density having a porosity of 40% to 60%. Korean Patent Application Publication No. 10-2011-0005479 has an excellent strength and a smooth flow of purified water by the nonwoven web. However, since the pore size of the nonwoven fabrics is large, ultrafine-sized foreign matters and ionic foreign substances cannot be filtered.

Korean Patent Application Publication No. 10-2012-0077266 discloses a filtering membrane comprising: a porous support including a porous nonwoven substrate composed of a thermoplastic polymer nanofiber aggregate having a fineness of 50 μm or less and having a pore size of 0.002 μm to 3 μm after being cross-linked with the polymer nanofiber aggregate; and an asymmetric membrane deposited on the porous support. However, in such a filtering membrane, the porous support is a nonwoven web having a porous property while maintaining the strength thereof, and the asymmetric membrane is a reverse osmosis membrane that allows water to pass through but not allow ions to pass therethrough. Thus, the filtering membrane performs only the function of filtering particles included in the water and larger than the pore size with the nonwoven web alone. As a result, a layered reverse osmosis membrane is required to filter ions.

Therefore, the filtering membrane disclosed in Korean Patent Application Publication No. 10-2012-0077266 is thick and requires a lot of manufacturing cost, and is not excellent in hydrophilicity and has a limitation in increasing the flow rate.

DISCLOSURE

Technical Problem

To overcome the above problems, it is an object of the present disclosure to provide an adsorptive liquid filter capable of maximizing the flow rate of liquid and improving the filtration performance of foreign substances.

It is another object of the present disclosure to provide an adsorptive liquid filter capable of enhancing the purification performance of contaminated liquid by incorporating an adsorptive membrane capable of adsorbing ionic foreign substances and ultrafine-sized foreign substances in the adsorptive liquid filter.

It is another object of the present disclosure to provide an adsorptive liquid filter capable of obtaining an excellent antibacterial property by including an adsorptive member made by accumulating nanofibers containing an antibacterial substance or by performing a silver yarn stitching process on a membrane.

Technical Solution

According to an aspect of the present disclosure, there is provided an adsorptive liquid filter comprising: a support tube having a hollow portion formed in a tubular shape and having a plurality of throughholes penetrating the hollow portion from an outer circumferential surface thereof; and an adsorptive membrane enclosing the outer circumferential surface of the support tube and adsorbing foreign substances contained in contaminated liquid, the adsorption membrane comprising: a support member having a plurality of first pores; and a first adsorptive member which is stacked on the support member and has a plurality of second pores formed therein and is made by accumulating ion exchange nanofibers for adsorbing foreign substances.

The adsorptive membrane applied in an adsorptive liquid filter according to an embodiment of the present disclosure, may be configured so that one side of the support tube may be opened, and the other side of the support tube may be closed so that the purified liquid supplied to the hollow portion may be discharged to one side of the support tube.

The adsorptive membrane applied in an adsorptive liquid filter according to an embodiment of the present disclosure may further include a case spaced from an outer circumferential surface of the adsorptive membrane, to contain the adsorptive membrane and to have an inlet port through which the contaminated liquid is introduced.

The adsorptive membrane applied in an adsorptive liquid filter according to an embodiment of the present disclosure may further include a first end cap, which is fixed to one side of the support tube and has a discharge port communicating with the hollow portion, and a second end cap having a flat plate shape fixed to the other side of the support tube.

The adsorptive membrane applied in an adsorptive liquid filter according to an embodiment of the present disclosure may have a corrugated structure formed with corrugations, and a protrusion may be formed on an outer circumferential surface of the support tube to engage with corrugations of the adsorptive membrane.

In the adsorptive membrane applied in an adsorptive liquid filter according to an embodiment of the present disclosure, the support member may be a nonwoven fabric or a woven fabric.

In the adsorptive membrane applied in an adsorptive liquid filter according to an embodiment of the present disclosure, the first pore size may be larger than the second pore size.

In the adsorptive membrane applied in an adsorptive liquid filter according to an embodiment of the present disclosure, the ion exchange nanofibers may be cation exchange nanofibers or anion exchange nanofibers, and may further include a second adsorptive member which is stacked on the first adsorptive member and has a plurality of third pores formed, and which is made by accumulating other ion exchange nanofibers that exchange ions of opposite polarity with those of the ion exchange nanofibers for the first adsorptive member.

The adsorptive membrane applied in an adsorptive liquid filter according to an embodiment of the present disclosure may further include a nanofiber web, which is stacked on the adsorptive member and has a plurality of pores, and which is made by accumulating nanofibers containing dopamine having a functional group for adsorbing foreign substances.

Here, the nanofiber web may have the functional group attached to the dopamine by a UV irradiation, a plasma treatment, an acid treatment, or a base treatment on a web prepared by electrospinning a spinning solution formed by mixing the dopamine with a solvent and a polymer substance. Here, the functional group may be a negative charge functional group or a positive charge functional group.

According to another aspect of the present disclosure, there is provided an adsorptive liquid filter comprising: a support tube having a hollow portion formed in a tubular shape and having a plurality of throughholes penetrating from the outer circumferential surface to the hollow portion; and an adsorptive membrane enclosing the outer circumferential surface of the support tube and adsorbing foreign substances contained in a contaminated liquid, wherein the contaminated liquid passes through the adsorptive membrane to be purified and the purified liquid is supplied to the hollow portion through the plurality of throughholes of the support tube, and wherein the adsorptive membrane comprises: a support member having a plurality of first pores; a first adsorptive member which is stacked on an upper surface of the support member and has a plurality of second pores formed therein and which is made by accumulating ion exchange nanofibers for adsorbing foreign substances; and a second adsorptive member which is stacked on the first adsorptive member and has a plurality of third pores, and which is made by accumulating nanofibers containing an antibacterial substance.

Here, the second and third pore sizes may be smaller than the first pore size, and the antibacterial substance may be a silver nanomaterial, and the second adsorptive member may have a nanofiber web structure formed by electrospinning a spinning solution prepared by dissolving the silver nanomaterial in an organic solvent together with a fiber formability polymer material.

The adsorptive membrane applied in an adsorptive liquid filter according to an embodiment of the present disclosure may have a corrugated structure formed with corrugations, and a protrusion may be formed on an outer circumferential surface of the support tube to engage with corrugations of the adsorptive membrane.

Advantageous Effects

According to the present disclosure, the adsorptive membrane is wrapped around the outer circumferential surface of the support tube having the plurality of throughholes, and a liquid filter structure is configured so that the liquid purified in the adsorptive membrane flows through the throughholes to the hollow portion of the support tube, to thereby increase the area of the adsorptive membrane through which the contaminated liquid passes to improve the adsorption efficiency of the foreign substances and to discharge the purified liquid to a single discharge port.

According to the present disclosure, there are advantages that it is possible to maximize the flow rate of the liquid by increasing a contact surface area of the liquid per unit area with the adsorptive membrane having the corrugated structure and the support tube having protrusions formed therein and engaged with the corrugations of the adsorptive membrane, and to improve the adsorption performance of the foreign substances.

According to the present disclosure, there are advantages that it is possible to adsorb ionic foreign substances in the ion exchange nanofibers of the adsorptive member and to physically filter the foreign substances having a size larger than the pore sizes of the pores of the support member and the pores of the adsorptive member to improve the adsorption efficiency of the foreign substances.

According to the present disclosure, the adsorptive member having the plurality of pores formed by the nanofibers is laminated on the support member having the plurality of pores to realize a membrane, thereby making it possible to improve the adsorption performance while preserving the passing flow rate.

According to the present disclosure, heavy metals, bacteria, and viruses contained in a liquid passing the adsorptive membrane may be adsorbed by nanofiber webs that are formed by accumulating nanofibers containing dopamine to which a functional group is attached, in which the nanofiber webs are included in the adsorptive membrane.

According to the present disclosure, the membrane contains the adsorptive member formed by accumulating nanofibers containing a large number of pores and antibacterial substances, or the membrane undergoes a silver yarn stitching process, to thus improve an antibacterial property.

BEST MODE

Hereinafter, embodiments of the present disclosure will be described in detail with reference to the accompanying drawings.

Embodiments of the present disclosure realize an adsorptive liquid filter having an adsorptive membrane containing an adsorptive member formed by accumulation of ion exchange nanofibers, thereby adsorbing ionic foreign substances contained in contaminated liquid in the ion exchange nanofibers, and physically filtering foreign substances having a size larger than a pore size in a plurality of pores.

Figure 1:
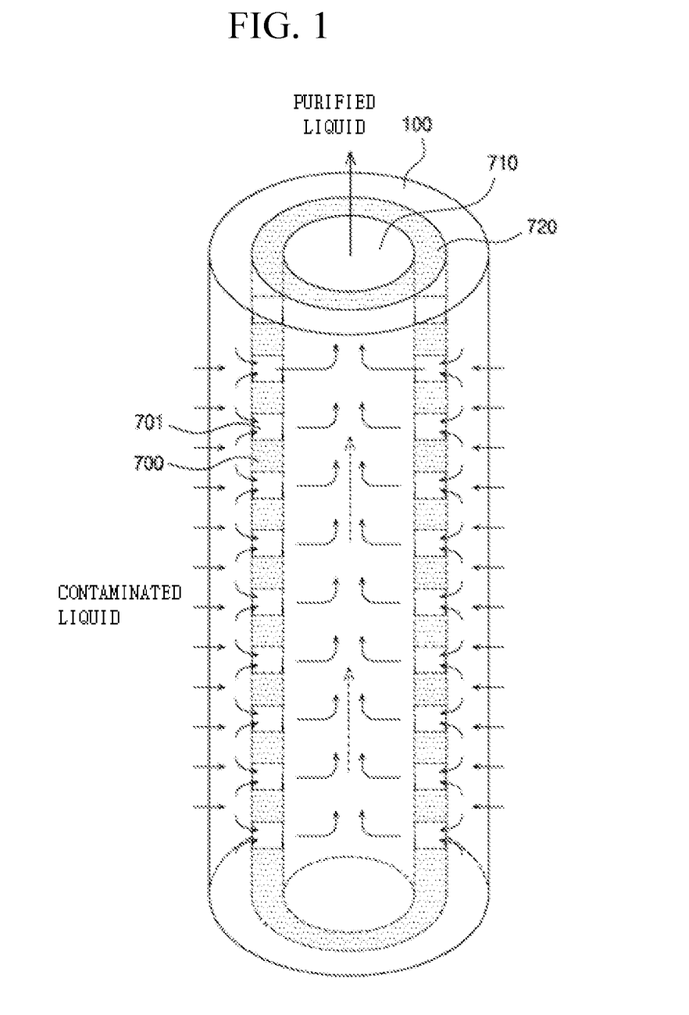
FIG. 1 is a perspective view for explaining a basic structure of an adsorptive liquid filter according to an embodiment of the present disclosure.

Referring to FIG. 1, the basic structure of the adsorptive liquid filter according to an embodiment of the present disclosure includes: a support tube 700 having a hollow portion 710 formed in a tubular shape and having a plurality of throughholes 710 penetrating the hollow portion 710 from an outer circumferential surface thereof; and an adsorptive membrane 100 enclosing the outer circumferential surface of the support tube 700 and adsorbing foreign substances contained in contaminated liquid, in which the contaminated liquid passes through the adsorptive membrane 100 to then be purified, and the purified liquid flows through the plurality of throughholes 701 of the support tube 700 to the hollow portion 710.

Here, the support tube 700 may have a rectangular shape, and one side of the support tube 700 may be opened and the other side thereof may be closed so that the purified liquid supplied to the hollow portion 710 may be discharged to one side of the support tube 700.

As will be described later, since the adsorptive membrane 100 includes a support member having a plurality of pores formed therein and an adsorptive member formed by accumulating ion exchange nanofibers for adsorbing foreign substances, an ionic foreign substance such as a heavy metal and a foreign substance having a large size may be adsorbed from the liquid passing through the adsorption membrane 100.

In some embodiments of the present disclosure, a structure capable of giving various functions or a structure capable of supplementing functions may be added to the basic structure of the adsorptive liquid filter of FIG. 1.

Figure 2:
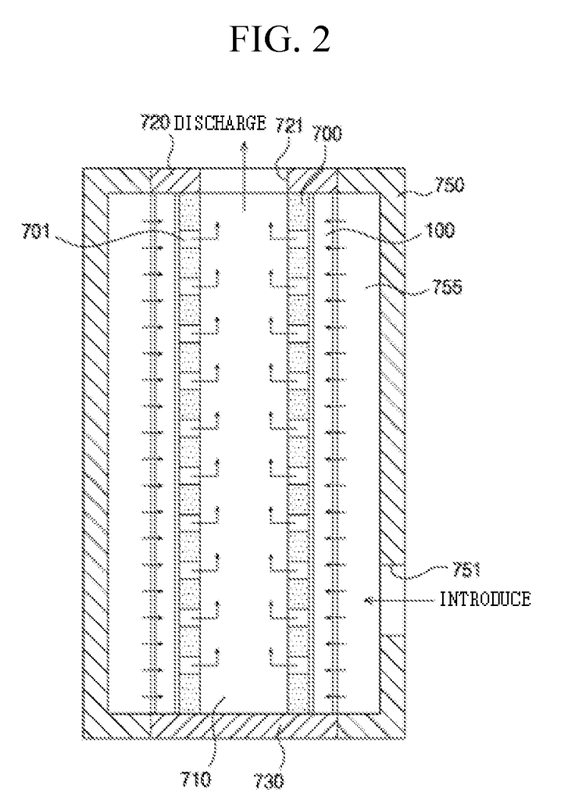
FIG. 2 is a schematic cross-sectional view for explaining the flow of liquid in an adsorptive liquid filter according to an embodiment of the present disclosure.

In other words, referring to FIG. 2, the adsorptive liquid filter may be provided with a case 750 in which a predetermined space 755 is formed and the adsorptive membrane 100 is built in, such that the contaminated liquid is uniformly and smoothly supplied to the adsorptive membrane 100. Here, the case 750 is spaced from the outer circumferential surface of the adsorptive membrane 100, and a space 755 is formed between the case 750 and the adsorptive membrane 100.

An inlet port 751 through which the contaminated liquid is introduced is formed in the case 750, and the contaminated liquid introduced into the inlet port 751 is infiltrated into the outer circumferential surface of the adsorptive membrane 100 while filling the space 755. Therefore, the contaminated liquid may be substantially uniformly introduced into the entire outer circumferential surface of the adsorptive membrane 100.

In some embodiments of the present disclosure, a first end cap 720 formed with a discharge port 721 communicating with the hollow portion 710 of the support tube 700 may be fixed to one side of the support tube 700, and a flat plate type second end cap 730 may be fixed to the other side of the support tube 700.

Thus, one side of the support tube 700 is opened by the first end cap 720 and the other side of the support tube 700 is closed by the second end cap 730 so that the liquid purified when passing through the adsorptive membrane 100 is discharged to the hollow portion 710 through the plurality of through holes 701 of the support tube 700 and discharged to a discharge port 721 of the first end cap 720 from the hollow portion 710.

According to some embodiments of the present disclosure as described above, the adsorptive liquid filter may be realized by wrapping the adsorptive membrane around the outer circumferential surface of the support tube having the plurality of throughholes, so that the liquid purified in the adsorptive membrane flows through the throughholes to the hollow portion of the support tube, to thereby increase the area of the adsorptive membrane through which the contaminated liquid passes to improve the adsorption efficiency of the foreign substances and to discharge the purified liquid to a single discharge port.

Figure 3:
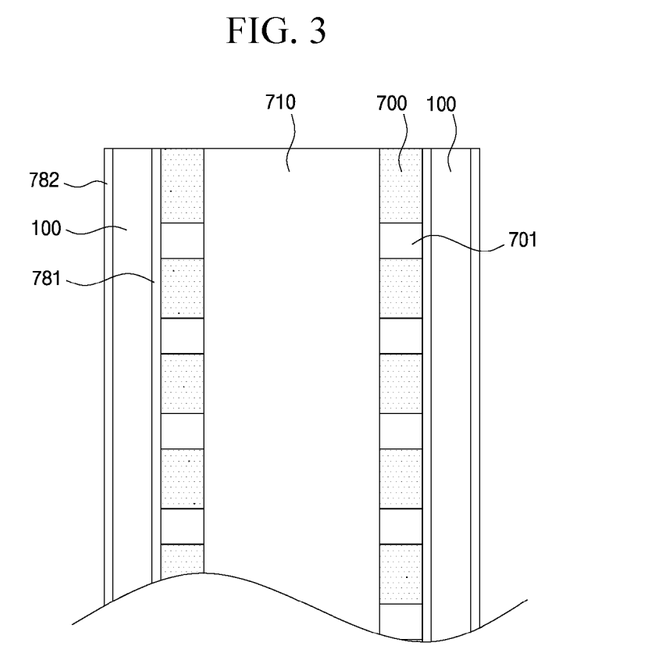
FIG. 3 is a schematic cross-sectional view showing a state in which a reinforcing mesh is formed on either side of an adsorptive membrane of an adsorptive liquid filter according to an embodiment of the present disclosure.

Referring to FIG. 3, in some embodiments of the present disclosure, reinforcing meshes 781 and 782 may be laminated on both sides of the adsorptive membrane 100 of the adsorptive liquid filter. These reinforcing meshes 781 and 782 are provided to prevent deformation and damage to the adsorptive membrane 100 due to the velocity and the flow rate of the liquid.

The reinforcing meshes 781 and 782 may be formed of various materials such as fibers, plastics, and metals, and are implemented in a network structure so that the liquid can flow uniformly.

Figure 4:
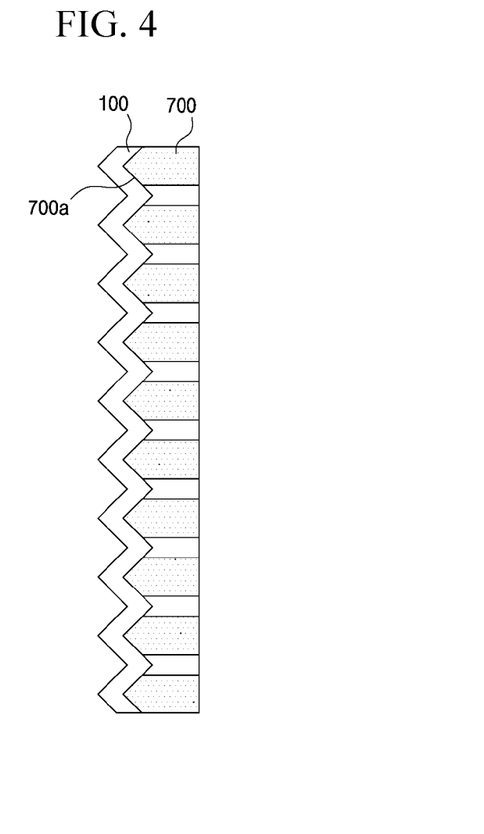
FIG. 4 is a partial cross-sectional view schematically illustrating an adsorptive membrane having a corrugated structure according to an embodiment of the present disclosure.

Meanwhile, as shown in FIG. 4, the adsorptive membrane 100 may be formed in a corrugated structure, and protrusions 700a may be formed on the outer circumferential surface of the support tube 700 to be engaged with corrugations of the adsorptive membrane 100.

When the adsorptive membrane 100 is formed in a corrugated structure as described above, the contact surface area of the passing liquid per unit area is increased, and thus there are advantages that the performance of purifying the liquid in the adsorptive membrane 100 can be improved, and the flow rate of the passing liquid can be increased.

Figure 5:
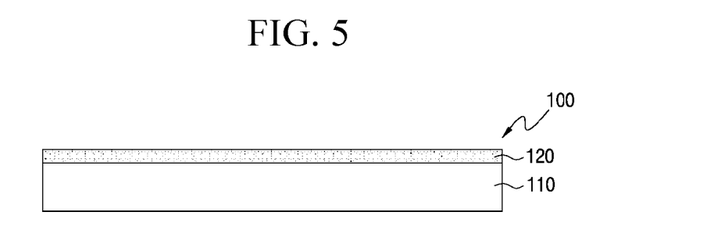
FIG. 5 is a cross-sectional view of an adsorptive membrane applied to an adsorptive liquid filter according to a first embodiment of the present disclosure.

Referring to FIG. 5, the adsorptive membrane 100 applied to the adsorptive liquid filter according to the first embodiment of the present disclosure includes: a support member 110 having a plurality of first pores; and an adsorptive member 120 which is stacked on the support member 110 and has a plurality of second pores formed therein, and which is made by accumulating ion exchange nanofibers for adsorbing foreign substances.

The adsorptive membrane 100 absorbs ionic foreign substances by the ion exchange nanofibers of the adsorption member 120 and physically filters the foreign substances having a size larger than the pore size by the first pores of the support member 110 and the second pores of the adsorptive member 120, to thus enhance the adsorption efficiency of the foreign substances.

Figure 6:
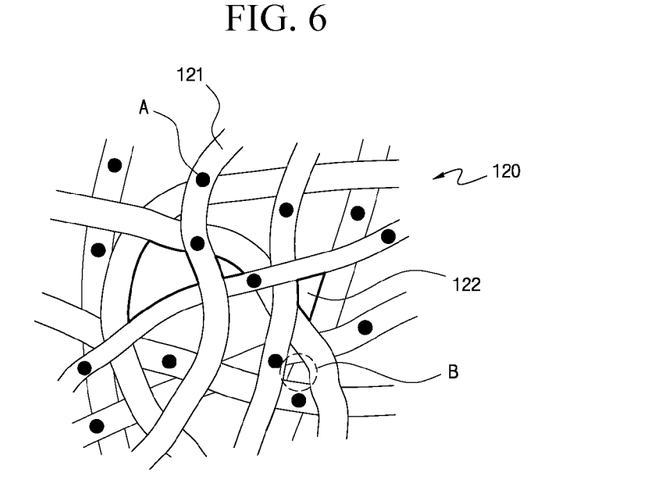
FIG. 6 is a schematic view for explaining the principle of adsorption of foreign substances to an adsorptive member applied to an adsorptive liquid filter according to an embodiment of the present disclosure.

In other words, as shown in FIG. 6, when the liquid is passed through the adsorptive membrane 100, the ionic foreign substances A contained in the liquid are adsorbed by the ion exchange nanofibers 121 of the adsorptive member 120, and the large-size foreign substances B included in the liquid do not pass through the second pores 122 of the adsorptive member 120 and are trapped inside the adsorptive member 120. As a result, the foreign substances A and B are restrained in the adsorption state (the state that the foreign substances cannot escape from and stick to the inside of the adsorptive member 120) within the adsorptive membrane 100, and thus the adsorption performance of the adsorptive membrane 100 according to some embodiments of the present disclosure may be increased.

Here, the second pores 122 of the adsorptive member 120 can adsorb and filter nano-scale fine contaminants contained in the liquid as micropores.

Therefore, the adsorptive membrane according to some embodiments of the present disclosure is not a non-porous membrane structure but is formed by laminating an adsorptive member having a plurality of pores made of nanofibers on a support member having a plurality of pores, to thus have advantages that the filtration performance can be improved while preserving the passing flow rate.

In addition, in some embodiments of the present disclosure, the large-size foreign substances B contained in the liquid do not pass through even the first pores of the support member 110 but are filtered therethrough. Here, the first pore size of the support member 110 is preferably larger than the second pore size 122 of the adsorptive member 120.

The support member 110 serves as a passageway for passing the liquid through the plurality of first pores and serves as a support layer for supporting the adsorptive member 120 to maintain the flat plate shape. Here, the support member 110 is preferably a nonwoven fabric or a woven fabric.

The usable nonwoven fabric may be any one of a meltblown nonwoven fabric, a spun bond nonwoven fabric, a thermal bond nonwoven fabric, a chemical bond nonwoven fabric, and a wet-laid nonwoven fabric. The fiber diameter of the nonwoven fabric may be 40 µm to 50 µm, and the pore size thereof may be 100 µm or more.

In addition, in some embodiments of the present disclosure, since the adsorptive member 120 made by accumulating ion exchange nanofibers has poor handle ability and strength, the adsorptive member 120 and the support member 110 are laminated to thereby implement an adsorptive membrane having excellent handle ability and strength.

Meanwhile, since the adsorptive member 120 made by accumulating the ion exchange nanofibers is expensive, implementing of the adsorptive membrane 100 in some embodiments of the present disclosure only by the single adsorptive member 120, requires a lot of manufacturing cost. Therefore, in some embodiments of the present disclosure, it is possible to reduce the manufacturing cost by stacking the supporting member, which is much cheaper than the adsorptive member 120 made by accumulating the ion exchange nanofibers, on the adsorptive member 120. In this case, the expensive adsorptive member 120 is designed to be thin and the low-priced support member 110 is designed to be thick, so that the manufacturing cost can be optimized at low cost.

In some embodiments of the present disclosure, an ion exchange solution is electrospun to discharge ion exchange nanofibers to the support member, and the discharged ion exchange nanofibers are accumulated in the support member 110 to produce the adsorptive member 120.

The ion exchange solution can be defined as a solution synthesized by a synthesis process such as bulk polymerization of a polymer, a solvent and ion exchange functional groups.

Since the ion exchange functional groups are contained in the ion exchange nanofibers, ionic foreign substances such as heavy metals contained in the liquid passing through the adsorptive membrane 100 are adsorbed to the ion exchange functional groups by substitution. As a result, the ionic foreign substances are adsorbed to the ion-exchange nanofibers by the ion exchange functional groups.

For example, when the ion exchange functional groups are $SO_3H$, and/or $NH_4CH_3$, the ionic foreign substances (for example, ionic heavy metal cations or heavy metal anions) contained in water are replaced with $H^+$ and/or $CH_3^+$ and adsorbed to the ion exchange functional groups.

Here, the ion exchange functional groups include a cation exchange functional group selected from a sulfonic acid group, a phosphoric acid group, a phosphonic group, a phosphonic group, a carboxylic acid group, an arsonic group, a selenonic group, an iminodiacetic acid group and a phosphoric acid ester group; or an anion exchange functional group selected from a quaternary ammonium group, a tertiary amino group, a primary amino group, an imine group, a tertiary sulfonium group, a phosphonium group, a pyridyl group, a carbazolyl group and an imidazolyl group.

Here, the polymer is a resin that is capable of being electrospun, capable of being dissolved in an organic solvent for electrospinning, and capable of forming nanofibers by electrospinning, but is not particularly limited thereto. For example, the polymer may include: polyvinylidene fluoride (PVdF), poly (vinylidene fluoride-co-hexafluoropropylene), perfluoropolymers, polyvinyl chloride, polyvinylidene chloride, or co-polymers thereof; polyethylene glycol derivatives containing polyethylene glycol dialkylether and polyethylene glycol dialkyl ester; polyoxide containing poly (oxymethylene-oligo-oxyethylene), polyethylene oxide and polypropylene oxide; polyacrylonitrile co-polymers containing polyvinyl acetate, poly (vinyl pyrrolidone-vinyl acetate), polystyrene and polystyrene acrylonitrile co-polymers, polyacrylonitrile (PAN), or polyacrylonitrile methyl methacrylate co-polymers; and polymethyl methacrylate and polymethyl methacrylate co-polymers, or a mixture thereof.

In addition, examples of the usable polymer may include: aromatic polyester such as polyamide, polyimide, polyamide-imide, poly (meta-phenylene iso-phthalamide), polysulfone, polyether ketone, polyethylene terephthalate, polytrimethylene terephthalate, and polyethylene naphthalate; polyphosphazenes such as polytetrafluoroethylene, polydiphenoxy phosphazene, and poly {bis [2-(2-methoxyethoxy) phosphazene]}; polyurethane co-polymers including polyurethane and polyether urethane; cellulose acetate, cellulose acetate butylrate, cellulose acetate propionate, and the like.

As the polymer preferable for the adsorptive member, PAN, polyvinylidene fluoride (PVdF), polyester sulfone (PES) and polystyrene (PS) may be used alone or a mixture of polyvinylidene fluoride (PVdF) and polyacrylonitrile (PAN), or a mixture of PVDF and PES, and a mixture of PVdF and thermoplastic polyurethane (TPU) may be used.

As the solvent, a mono-component solvent such as dimethylformamide (DMF) can be used. However, when a two-component solvent is used, it is preferable to use a two-component solvent in which a high boiling point (BP) solvent and a low boiling point (BP) solvent are mixed with each other.

As described above, a plurality of ultrafine pores (i.e., second pores) are formed between the ion exchange nanofibers that are accumulated randomly in the adsorptive member 120 which is formed by accumulating the ion exchange nanofibers in the support member 110.

The diameter of each of the ion exchange nanofibers is preferably in the range of 0.1 μm to 10.0 μm, and the thickness of the adsorptive member 120 is freely adjusted according to a spinning time from an electrospinning apparatus. The second pore size is determined according to the thickness of the adsorptive member 120.

The ion exchange nanofibers can be defined as having ion exchange functional groups having ion-exchange ability on the surfaces of the ion exchange nanofibers. Depending on the ions exchanged in the ion exchange functional groups, the ion exchange nanofibers can be cation exchange nanofibers or anion exchange nanofibers.

The adsorptive member 120 formed by accumulating the ion exchange nanofibers is a web structure of ion exchange nanofibers. The web is ultra-thin, ultra-light in weight, large in specific surface area, and high in porosity.

In some embodiments of the present disclosure, the ion exchange nanofibers are accumulated in the support member 110 by electrospinning the ion exchange nanofibers to form the adsorptive member 120, thereby increasing a coupling force between the support member 110 and the adsorptive member 120. Accordingly, there is an advantage that the adsorptive member 120 can be prevented from being peeled off from the support member 110 by external force.

Figure 7:
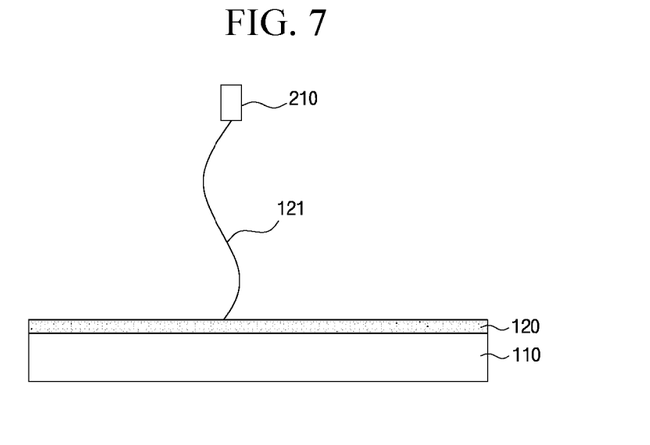
FIG. 7 is a view schematically showing a state in which ion exchange nanofibers are accumulated by electrospinning a spinning solution to a support member according to an embodiment of the present disclosure.

In other words, as shown in FIG. 7, the ion exchange nanofibers 121 discharged from a spinning nozzle 210 of the electrospinning apparatus are stacked on the supporting member 110, and the stacked ion exchange nanofibers 121 are accumulated, and thus a web-shaped adsorptive member 120 is formed.

FIGS. 8 to 11 are cross-sectional views of the adsorptive membrane applied to the adsorptive liquid filter according to the second to fifth embodiments of the present disclosure, respectively.

Figure 8:
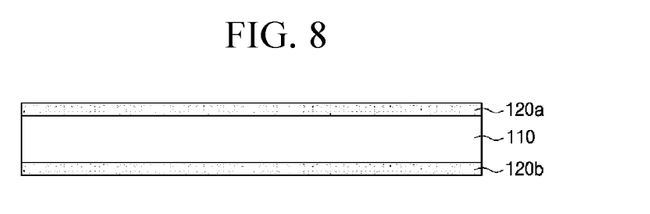
FIG. 8 is a cross-sectional view of an adsorptive membrane applied to an adsorptive liquid filter according to a second embodiment of the present disclosure.

Referring to FIG. 8, an adsorptive membrane applied to an adsorptive liquid filter according to the second embodiment of the present disclosure includes: a support member 110 having a plurality of first pores; a first adsorptive member 120a stacked on an upper surface of the support member 110 and having a plurality of second pores formed therein and made by accumulating ion exchange nanofibers for adsorbing foreign substances; and a second adsorptive member 120b stacked on a lower surface of the support member 110 and having a plurality of third pores formed therein and made by accumulating ion exchange nanofibers for adsorbing foreign substances.

The adsorptive membrane applied in an adsorptive liquid filter according to the second embodiment is configured to include first and second adsorptive members 120a and 120b that are laminated on both sides of the support member 110 to adsorb the ionic foreign substances not adsorbed by the first adsorption member 120a, and foreign substances having pore sizes larger than the pore sizes of the third pores by the second adsorptive member 120b, thereby increasing the adsorption efficiency of foreign substances.

Here, the first pore size may be designed to be the largest, the second pore size may be designed to have an intermediate size between the first pore size and the third pore size, and the third pore size may be designed to be the smallest.

Figure 9:
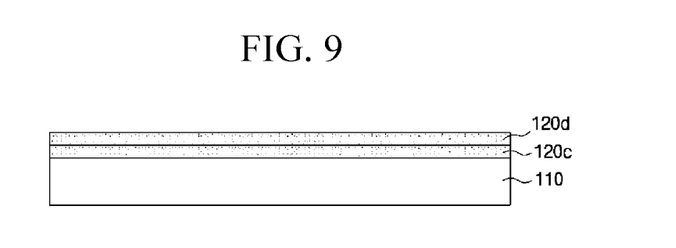
FIG. 9 is a cross-sectional view of an adsorptive membrane applied to an adsorptive liquid filter according to a third embodiment of the present disclosure.

Referring to FIG. 9, an adsorptive membrane applied to an adsorptive liquid filter according to the third embodiment of the present disclosure includes: a support member 110 having a plurality of first pores; a first adsorptive member 120c stacked on an upper surface of the support member 110 and having a plurality of second pores formed therein and made by accumulating first ion exchange nanofibers for adsorbing foreign substances; and a second adsorptive member 120d stacked on an upper surface of the first adsorptive member 120c and having a plurality of third pores formed therein and made by accumulating second ion exchange nanofibers for adsorbing foreign substances.

The first ion exchange nanofibers of the first adsorptive member 120c may be cation exchange nanofibers or anion exchange nanofibers, and the second ion exchange nanofibers of the second adsorptive member 120d may be nanofibers that exchange ions of opposite polarity to the first ion exchange nanofibers. That is, when the first ion exchange nanofibers are the cation exchange nanofibers, the second ion exchange nanofibers are the anion exchange nanofibers.

Therefore, the adsorptive membrane applied in an adsorptive liquid filter according to the third embodiment is advantageous in that both the cation heavy metal and anion heavy metal contained in the passing liquid can be adsorbed by the first and second adsorptive members 120c and 120d.

Figure 10:
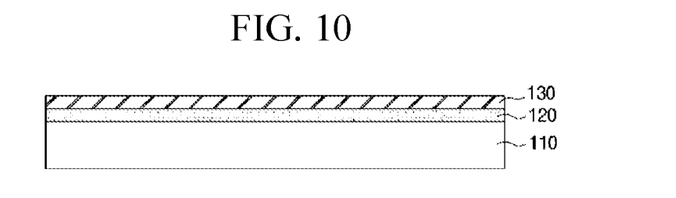
FIG. 10 is a cross-sectional view of an adsorptive membrane applied to an adsorptive liquid filter according to a fourth embodiment of the present disclosure.

Referring to FIG. 10, an adsorptive membrane applied to an adsorptive liquid filter according to the fourth embodiment of the present disclosure includes: a support member 110 having a plurality of first pores; a first adsorptive member 120 stacked on an upper surface of the support member 110 and having a plurality of second pores formed therein and made by accumulating first ion exchange nanofibers for adsorbing foreign substances; and a second adsorptive member 130 stacked on an upper surface of the first adsorptive member 120 and having a plurality of third pores formed therein and made by accumulating nanofibers containing antibacterial substances.

The adsorptive membrane applied in an adsorptive liquid filter according to the fourth embodiment can adsorb ionic foreign substances by the ion exchange nanofibers of the first adsorptive member 120 and can have the antibacterial property by the nanofibers containing the antibacterial substance of the second adsorptive member 130.

The adsorptive membrane can also physically filter and adsorb foreign substances having a size larger than the pore size in each of the first to third pores.

Here, the antibacterial substances are preferably silver nanomaterials. Here, the silver nanomaterials are silver (Ag) salts such as silver nitrate ($AgNO_3$), silver sulfate ($Ag_2SO_4$), and silver chloride (AgCl).

In some embodiments of the present disclosure, a silver nanomaterial is dissolved in an organic solvent together with a fiber formability polymer material to prepare a spinning solution, and the spinning solution is electrospun to obtain a second adsorptive member 130 of a nanofiber web structure formed by accumulating nanofibers containing an antibacterial substance.

Figure 11:
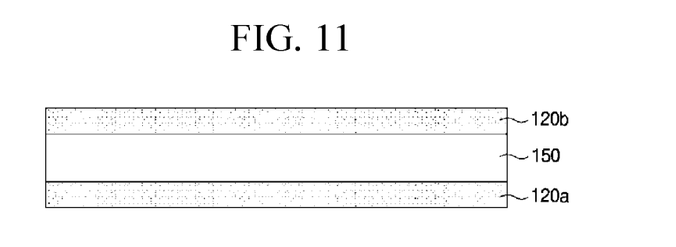
FIG. 11 is a cross-sectional view of an adsorptive membrane applied to an adsorptive liquid filter according to a fifth embodiment of the present disclosure.

In the adsorptive membrane applied in an adsorptive liquid filter according to the fifth embodiment of the present disclosure may further include a nanofiber web, which has a plurality of pores, and which is made by accumulating nanofibers containing dopamine having a functional group for adsorbing foreign substances. Here, the nanofiber web containing dopamine is preferably laminated on the adsorptive member.

For example, as shown in FIG. 11, the adsorptive membrane may be implemented by interposing a nanofiber web 150 between the first and second adsorptive members 120*a* and 120*b*, in which the nanofiber web 150 is made by accumulating nanofibers having a plurality of pores formed and containing dopamine, to which a functional group capable of adsorbing foreign substances is attached.

Here, the first and second adsorptive members 120*a* and 120*b* are adsorptive members formed by accumulating ion exchange nanofibers having a plurality of pores and adsorbing foreign substances, and the nanofiber web 150 is produced by electrospinning a spinning solution which is made by mixing a dopamine monomer or polymer, a solvent and a polymer substance.

Dopamine (i.e. 3,4-dihydroxyphenylalamine) has a structure in which $-NH_2$ and $-OH$ are bonded to a benzene ring.

The functional groups attached to the dopamine contained in the nanofiber can be formed by a post-treatment such as UV irradiation, plasma treatment, acid treatment, and base treatment after forming a nanofiber web containing a dopamine monomer or polymer. Finally, the nanofiber web containing dopamine is in a state where the functional group is attached to the nanofiber.

Here, the functional group can function as a negative charge functional group such as $SO_3H^-$ or a positive charge functional group such as $NH_4^+$ to adsorb heavy metals, bacteria and viruses. Thus, the adsorptive membrane applied in an adsorptive liquid filter according to the fifth embodiment of the present disclosure can filter heavy metals, bacteria and viruses contained in the passing liquid and adsorb the filtered heavy metals, bacteria and viruses inside the adsorptive membrane.

Figure 12:
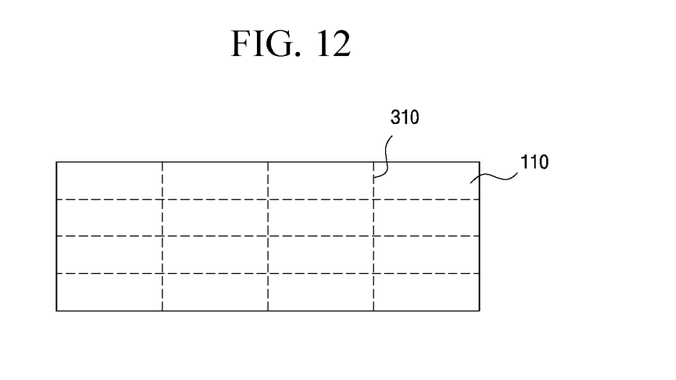
FIG. 12 is a schematic plan view for explaining a state in which a silver yarn stitching process is applied on an adsorptive membrane applied to an adsorptive liquid filter according to an embodiment of the present disclosure.

FIG. 12 is a schematic plan view for explaining a state in which a silver yarn stitching process is applied on an adsorptive membrane applied to an adsorptive liquid filter according to an embodiment of the present disclosure.

According to the embodiments of the present disclosure, the adsorptive membrane including the support member can be subjected to a silver yarn stitching process to realize an adsorptive membrane having antimicrobial properties by the stitched silver yarn. Here, the silver yarn stitching process may be performed on one or both of the support member and the adsorptive member of the adsorptive membrane.

Here, since the adsorptive member of the adsorptive membrane has a relatively lower strength than the support member, if the silver yarn is stitched to the adsorptive member, damage to the adsorptive member may be caused by the stitched silver yarn.

Meanwhile, the support member has strength enough to withstand the silver yarn stitching process, thereby stitching the silver yarn 310 on the support member 110, as shown in FIG. 12. In this case, it is preferable that the silver yarn 310 is stitched in a lattice pattern, but it is not limited thereto.

The silver yarn is a thread made of silver. The silver yarn stitched to the support member 110 can kill the bacteria contained in the passing liquid, and the adsorptive membrane can have a strong antibacterial property.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

The present disclosure is applicable to various kinds of adsorptive liquid filters capable of maximizing the flow rate of liquid and improving the purifying performance of contaminated liquid.

What is claimed is:

1. An adsorptive liquid filter comprising:
a support tube having a hollow portion formed in a tubular shape and having a plurality of throughholes penetrating the hollow portion from an outer circumferential surface thereof; and
an adsorptive membrane enclosing the outer circumferential surface of the support tube and adsorbing foreign substances contained in contaminated liquid,
wherein the adsorptive membrane has a corrugated structure formed with corrugations, and a protrusion is formed on the outer circumferential surface of the support tube to engage with the corrugations of the adsorptive membrane, and
wherein the adsorptive membrane comprises: a support member having a plurality of first pores; and a first adsorptive member which is stacked on the support member and has a plurality of second pores formed therein, the first adsorptive member being made of accumulated ion exchange nanofibers for adsorbing foreign substances.

2. The adsorptive liquid filter of claim 1, wherein one side of the support tube is opened, and the other side of the support tube is closed so that purified liquid supplied to the hollow portion is discharged to the one side of the support tube.

3. The adsorptive liquid filter of claim 1, further comprising a case spaced from an outer circumferential surface of the adsorptive membrane, to contain the adsorptive membrane and to have an inlet through which the contaminated liquid is introduced.

4. The adsorptive liquid filter of claim 1, further comprising a first end cap, which is fixed to one side of the support tube and has a discharge port communicating with the hollow portion, and a second end cap having a flat plate shape fixed to the other side of the support tube.

5. The adsorptive liquid filter of claim 1, wherein the support member is a nonwoven fabric or a woven fabric.

6. The adsorptive liquid filter of claim 1, wherein the first pores have a size larger than that of the second pores.

7. The adsorptive liquid filter of claim 1, wherein the accumulated ion exchange nanofibers are cation exchange nanofibers or anion exchange nanofibers, wherein the adsorptive membrane further comprises: a second adsorptive member which is stacked on the first adsorptive member and has a plurality of third pores formed, and wherein the second adsorptive member is made of accumulated ion exchange nanofibers having opposite polarity to that of the first adsorptive member.

8. The adsorptive liquid filter of claim 1, further comprising a nanofiber web, which is stacked on the adsorptive member and has a plurality of pores, the nanofiber web being made of accumulated nanofibers containing dopamine having a functional group for adsorbing foreign substances.

9. The adsorptive liquid filter of claim 1, further comprising silver yarn stitched to one or both of the support member and the first adsorptive member.

10. An adsorptive liquid filter comprising:

a support tube having a hollow portion formed in a tubular shape and having a plurality of throughholes penetrating from an outer circumferential surface thereof to the hollow portion; and an adsorptive membrane enclosing the outer circumferential surface of the support tube and adsorbing foreign substances contained in a contaminated liquid, wherein the contaminated liquid passes through the adsorptive membrane to be purified and purified liquid is supplied to the hollow portion through the plurality of throughholes of the support tube, and wherein the adsorptive membrane has a corrugated structure formed with corrugations, and a protrusion is formed on the outer circumferential surface of the support tube to engage with the corrugations of the adsorptive membrane, and wherein the adsorptive membrane comprises: a support member having a plurality of first pores; a first adsorptive member which is stacked on an upper surface of the support member and has a plurality of second pores formed therein, the first adsorptive member being made of accumulated ion exchange nanofibers for adsorbing foreign substances; and a second adsorptive member which is stacked on the first adsorptive member and has a plurality of third pores, the second adsorptive member being made of accumulated nanofibers containing an antibacterial substance.

11. The adsorptive liquid filter of claim 10, wherein the second pores and the third pores have a size smaller than that of the first pores.

12. The adsorptive liquid filter of claim 10, wherein the antibacterial substance is a silver nanomaterial.

13. The adsorptive liquid filter of claim 12, wherein the second adsorptive member has a nanofiber web structure formed of accumulated electrospun nanofiber, the accumulated electrospun nanofiber being formed of a fiber forming polymer material and the silver nanomaterial.

* * * * *